United States Patent
Zhu et al.

(10) Patent No.: US 11,313,447 B1
(45) Date of Patent: Apr. 26, 2022

(54) POWER-SPLIT HYDRO-MECHANICAL HYBRID TRANSMISSION SYSTEM WITH AUTOMATIC ADJUSTMENT FUNCTION

(71) Applicant: JIANGSU UNIVERSITY, Zhenjiang (CN)

(72) Inventors: Zhen Zhu, Zhenjiang (CN); Yingfeng Cai, Zhenjiang (CN); Long Chen, Zhenjiang (CN); Juncheng Wang, Zhenjiang (CN); Changgao Xia, Zhenjiang (CN); Jiangyi Han, Zhenjiang (CN); Xing Xu, Zhenjiang (CN); Dehua Shi, Zhenjiang (CN); Lei Dou, Zhenjiang (CN); Jiajia Wang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/430,733

(22) PCT Filed: Aug. 4, 2020

(86) PCT No.: PCT/CN2020/106688
§ 371 (c)(1),
(2) Date: Aug. 13, 2021

(87) PCT Pub. No.: WO2022/016608
PCT Pub. Date: Jan. 27, 2022

(30) Foreign Application Priority Data

Jul. 20, 2020 (CN) .......................... 202010697629.1

(51) Int. Cl.
*F16H 37/08* (2006.01)
*F16H 47/04* (2006.01)
*F16H 61/00* (2006.01)

(52) U.S. Cl.
CPC ......... *F16H 47/04* (2013.01); *F16H 61/0009* (2013.01); *F16H 2037/088* (2013.01);
(Continued)

(58) Field of Classification Search
CPC ................. F16H 47/04; F16H 61/0009; F16H 2037/088; F16H 2047/045;
(Continued)

(56) References Cited

U.S. PATENT DOCUMENTS 4,994,002 A * 2/1991 Valotto ................... F16H 47/04
475/72
2010/0298081 A1* 11/2010 Ivanysynova ............ B60K 6/12
475/72

FOREIGN PATENT DOCUMENTS

CN        205524229 U    8/2016
CN        109519512 A    3/2019
(Continued)

*Primary Examiner* — Justin Holmes
(74) *Attorney, Agent, or Firm* — Bayramoglu Law Offices LLC

(57) ABSTRACT

A power-split hydro-mechanical hybrid transmission system with an automatic adjustment function includes an input member, a hydraulic transmission mechanism, a split mechanism, a convergence mechanism, an output member, a clutch assembly, and a brake assembly. The clutch assembly connects the input member to an input end of the split mechanism, connects an output end of the split mechanism to an input end of the hydraulic transmission mechanism and an input end of the convergence mechanism, and connects an output end of the hydraulic transmission mechanism to the output member. An output end of the convergence mechanism is connected to the output member. The clutch assembly and the brake assembly provide a continuous transmission ratio between the input member and the output member. The power-split hydro-mechanical hybrid trans-
(Continued)

mission system enables multi-mode continuously variable transmission and has energy reuse and emergency support functions.

7 Claims, 13 Drawing Sheets

(52) U.S. Cl.
CPC ............... *F16H 2047/045* (2013.01); *F16H 2061/0034* (2013.01); *F16H 2200/2007* (2013.01); *F16H 2200/2051* (2013.01)

(58) Field of Classification Search
CPC ..... F16H 2061/0034; F16H 2200/2007; F16H 2200/2051
See application file for complete search history.

(56) References Cited

FOREIGN PATENT DOCUMENTS

| | | | | |
|---|---|---|---|---|
| CN | 109723789 A | 5/2019 | | |
| CN | 109764107 A | 5/2019 | | |
| CN | 111350799 A | 6/2020 | | |
| WO | WO-2012171812 A1 * | 12/2012 | ............. | F16H 3/728 |
| WO | WO-2019091693 A1 * | 5/2019 | ............. | B60K 6/365 |

* cited by examiner

POWER-SPLIT HYDRO-MECHANICAL HYBRID TRANSMISSION SYSTEM WITH AUTOMATIC ADJUSTMENT FUNCTION

CROSS REFERENCE TO THE RELATED APPLICATIONS

This application is the national phase entry of International Application No. PCT/CN2020/106688, filed on Aug. 4, 2020, which is based upon and claims priority to Chinese Patent Application No. 202010697629.1, filed on Jul. 20, 2020, the entire contents of which are incorporated herein by reference.

TECHNICAL FIELD

The present invention relates to the field of vehicle gearboxes, and in particular, to a power-split hydro-mechanical hybrid transmission system with an automatic adjustment function.

BACKGROUND

The hydro-mechanical hybrid transmission adopts hydraulic transmission for startup, hydro-mechanical transmission for operation, and mechanical transmission for transfer to adapt to different working conditions. The hydro-mechanical transmission is mainly divided into two modes: power split and power convergence. The power split mode is implemented by arranging a 2K-H planetary gear mechanism on the front side and is mainly suitable for low-power transmission systems, while the power convergence mode is implemented by arranging a 2K-H planetary gear mechanism on the rear side and is mainly suitable for high-power transmission systems.

The conventional hydraulic speed regulation is mainly implemented by volume, that is, the displacement of a variable displacement pump is controlled for speed regulation. It is difficult for an engine serving as a power source to meet the requirements on both power and fuel economy; and if a motor is adopted for speed regulation, it is difficult to meet the requirements on traction power of the high-power transmission system typically adopting the power convergence mode, while it is one of the feasible solutions to improve the performance of the low-power transmission system typically adopting the power split mode.

The current research mainly focuses on the safe and reliable performance and the energy conservation and emission reduction characteristics of vehicle transmission systems, but only a few applications are made in terms of hydro-mechanical hybrid transmission. A hydraulic transmission mechanism taking safety, reliability, and energy utilization into account can greatly improve the performance of the hydro-mechanical hybrid transmission system.

SUMMARY

To eliminate the defects in the prior art, the present invention provides a power-split hydro-mechanical hybrid transmission system with an automatic adjustment function, which enables multi-mode continuously variable transmission and has energy reuse and emergency support functions.

The present invention achieves the above objective through the following technical solution.

A power-split hydro-mechanical hybrid transmission system with an automatic adjustment function includes an input member, a hydraulic transmission mechanism, a split mechanism, a convergence mechanism, an output member, a clutch assembly, and a brake assembly, wherein the clutch assembly connects the input member to an input end of the split mechanism, connects an output end of the split mechanism to an input end of the hydraulic transmission mechanism and an input end of the convergence mechanism, and connects an output end of the hydraulic transmission mechanism to the output member; an output end of the convergence mechanism is connected to the output member; and the clutch assembly and the brake assembly provide a continuous transmission ratio between the input member and the output member.

Further, transmission modes including hydraulic transmission, hydro-mechanical transmission, and mechanical transmission are provided between the input member and the output member by adjusting a displacement ratio of the hydraulic transmission mechanism and selectively controlling engagement of the clutch assembly and the brake assembly.

Further, the split mechanism includes a split mechanism-ring gear, a split mechanism-planet carrier, and a split mechanism-sun gear, wherein the split mechanism-ring gear is connected to the input member;

the convergence mechanism includes a convergence mechanism-common ring gear, a convergence mechanism-small sun gear, a convergence mechanism-large sun gear, a convergence mechanism-short planet carrier, and a convergence mechanism-long planet carrier, wherein the convergence mechanism-short planet carrier is connected to the convergence mechanism-long planet carrier, and the convergence mechanism-long planet carrier is connected to the output member; the convergence mechanism-common ring gear, the convergence mechanism-small sun gear, and the convergence mechanism-short planet carrier form a planetary gear train, while the convergence mechanism-common ring gear, the convergence mechanism-large sun gear, and the convergence mechanism-long planet carrier form another planetary gear train;

the clutch assembly includes a clutch $C_1$ and a clutch $C_2$, wherein the clutch $C_1$ is used for selectively connecting the split mechanism-sun gear to the input end of the hydraulic transmission mechanism to achieve synchronous rotation, and the clutch $C_2$ is used for selectively connecting the output end of the hydraulic transmission mechanism to the output member to achieve synchronous rotation; the brake assembly includes a brake $B_1$, wherein the brake $B_1$ is used for selectively connecting the split mechanism-planet carrier to a fixed member;

the clutch $C_1$, the clutch $C_2$, and the brake $B_1$ are engaged to provide forward or reverse hydraulic transmission between the input member and the output member.

Further, the clutch assembly further includes a clutch $C_3$, a clutch $C_4$, and a clutch $C_5$, wherein the clutch $C_3$ is used for selectively connecting the split mechanism-planet carrier to the convergence mechanism-large sun gear to achieve synchronous rotation, the clutch $C_4$ is used for selectively connecting the convergence mechanism-small sun gear to the convergence mechanism-large sun gear to achieve synchronous rotation, and the clutch $C_5$ is used for selectively connecting the split mechanism-ring gear to the split mechanism-planet carrier to achieve synchronous rotation; the brake assembly further includes a brake $B_2$ and a brake $B_3$, wherein the brake $B_2$ is used for selectively connecting the convergence mechanism-small sun gear to a fixed member, and the brake $B_3$ is used for selectively connecting the convergence mechanism-common ring gear to a fixed member;

the clutch $C_3$, the clutch $C_5$, and the brake $B_3$ are engaged to provide reverse mechanical transmission between the input member and the output member; the clutch $C_3$, the clutch $C_5$, and the brake $B_2$ are engaged or the clutch $C_3$, the clutch $C_4$, and the clutch $C_5$ are engaged to provide different forward mechanical transmissions between the input member and the output member.

Further, the clutch $C_1$, the clutch $C_2$, the clutch $C_3$, and the brake $B_3$ are engaged to provide reverse hydro-mechanical transmission between the input member and the output member;

the clutch $C_1$, the clutch $C_2$, the clutch $C_3$, and the brake $B_2$ are engaged or the clutch $C_1$, the clutch $C_2$, the clutch $C_3$, and the clutch $C_4$ are engaged to provide different forward hydro-mechanical transmissions between the input member and the output member.

Further, the hydraulic transmission mechanism includes a variable displacement pump, an oil replenishing system, a solenoid directional valve $V_3$, a proportional throttle valve $V_8$, a safety valve group, a three-position four-way proportional directional valve $V_9$, a high-pressure accumulator $A_1$, a low-pressure accumulator $A_2$, an emergency valve $V_{10}$, and a pump/motor mechanism, wherein an input end of the variable displacement pump is connected to the output end of the split mechanism through the clutch $C_1$, an output end of the pump/motor mechanism is connected to the output member through the clutch $C_2$, the variable displacement pump is used for driving the pump/motor mechanism, the solenoid directional valve $V_3$ for one-way flow of oil is disposed on a high-pressure hydraulic pipe between an oil outlet of the variable displacement pump and an oil inlet of the pump/motor mechanism; the proportional throttle valve $V_8$ is disposed on a low-pressure hydraulic pipe between an oil inlet of the variable displacement pump and an oil outlet of the pump/motor mechanism; the proportional directional valve $V_9$ is connected in parallel between the low-pressure hydraulic pipe and the high-pressure hydraulic pipe; the high-pressure accumulator $A_1$ and the low-pressure accumulator $A_2$ are both connected to the proportional directional valve $V_9$;

the low-pressure hydraulic pipe and the high-pressure hydraulic pipe share the safety valve group for pressure adjustment of the pipes; the oil replenishing system is used for replenishing hydraulic oil in the low-pressure hydraulic pipe and/or the high-pressure hydraulic pipe.

Further, when the output member decelerates, the clutch $C_2$ is engaged, and braking energy of the output member is transmitted to the pump/motor mechanism; the pump/motor mechanism works as a hydraulic pump; the solenoid directional valve $V_3$ is controlled to be powered on, preventing the oil from flowing back to the variable displacement pump; the proportional throttle valve $V_8$ is controlled to reduce port opening, thereby increasing pressure at the oil outlet of the pump/motor mechanism; the proportional directional valve $V_9$ is controlled to make the low-pressure accumulator $A_2$ communicated with the oil inlet of the pump/motor mechanism to replenish oil; and the proportional directional valve $V_9$ is controlled to make the high-pressure accumulator $A_1$ communicated with the oil outlet of the pump/motor mechanism to store energy.

Further, when the output member accelerates, the pump/motor mechanism works as a hydraulic pump; the solenoid directional valve $V_3$ is controlled to be powered on, preventing the oil from flowing back to the variable displacement pump; the proportional directional valve $V_9$ is controlled to make the low-pressure accumulator $A_2$ communicated with the oil outlet of the pump/motor mechanism; the proportional directional valve $V_9$ is controlled to make the high-pressure accumulator $A_1$ communicated with the oil inlet of the pump/motor mechanism; the pump/motor mechanism is driven by the high-pressure accumulator $A_1$ alone or by both the high-pressure accumulator $A_1$ and the variable displacement pump; and the low-pressure accumulator $A_2$ is used for recovering residual energy.

Further, the emergency valve $V_{10}$ is further connected in parallel between the low-pressure hydraulic pipe and the high-pressure hydraulic pipe; the emergency valve $V_{10}$ is controlled to cut off power transmitted from the variable displacement pump, or switch power to be stored by the pump/motor mechanism, or release power stored in the high-pressure accumulator $A_1$ and the low-pressure accumulator $A_2$.

The present invention has the following beneficial effects:

1. The power-split hydro-mechanical hybrid transmission system with an automatic adjustment function of the present invention adopts hydraulic transmission, hydro-mechanical transmission, and mechanical transmission to adapt to different working conditions.

2. According to the power-split hydro-mechanical hybrid transmission system with an automatic adjustment function of the present invention, the displacement of the variable displacement pump is controlled to adjust the displacement ratio of the hydraulic transmission mechanism, a frequency converter is controlled to regulate the motor speed, and the corresponding clutch assembly and brake assembly are engaged or disengaged to improve various transmission modes in forward and reverse gears.

3. According to the power-split hydro-mechanical hybrid transmission system with an automatic adjustment function of the present invention, the main power source consisting of various types of valves, the frequency converter, and the motor, the auxiliary power source consisting of the accumulators, and the variable displacement pump are combined to provide a highly reliable and multi-degree-of-freedom transmission system.

1. frequency converter; 2. motor; 3. input shaft; 4. hydraulic transmission mechanism; 41. hydraulic transmission input gear pair; 42. clutch $C_1$; 43. variable displacement pump shaft; 44. variable displacement pump; 45. oil replenishing pump; 46. solenoid directional valve $V_3$; 47. proportional throttle valve $V_8$; 48. pilot-operated proportional relief valve $V_7$; 49. pilot-operated proportional relief valve $V_6$; 410. proportional directional valve $V_9$; 411. high-pressure accumulator $A_1$; 412. low-pressure accumulator $A_2$; 413. emergency valve $V_{10}$; 414. pump/motor mechanism; 415. pump/motor mechanism shaft. 416. hydraulic transmission output gear pair; 417. clutch $C_2$; 5. split mechanism; 51. clutch $C_5$; 52. split mechanism-ring gear; 53. split mechanism-planet carrier; 54. split mechanism-sun gear; 6. mechanical transmission mechanism; 61. brake $B_1$; 62. mechanical transmission shaft; 63. clutch $C_3$; 7. convergence mechanism; 71. brake $B_2$; 72. clutch $C_4$; 73. brake $B_3$; 74. convergence mechanism-common ring gear; 75. convergence mechanism-small sun gear; 76. convergence mechanism-large sun gear; 77. convergence mechanism-short planet carrier; 78. convergence mechanism-long planet carrier; 8. output shaft.

DETAILED DESCRIPTION OF THE EMBODIMENTS

The present invention is further described below with reference to the accompanying drawings and specific embodiments, but the protection scope of the present invention is not limited thereto.

Figure 1:
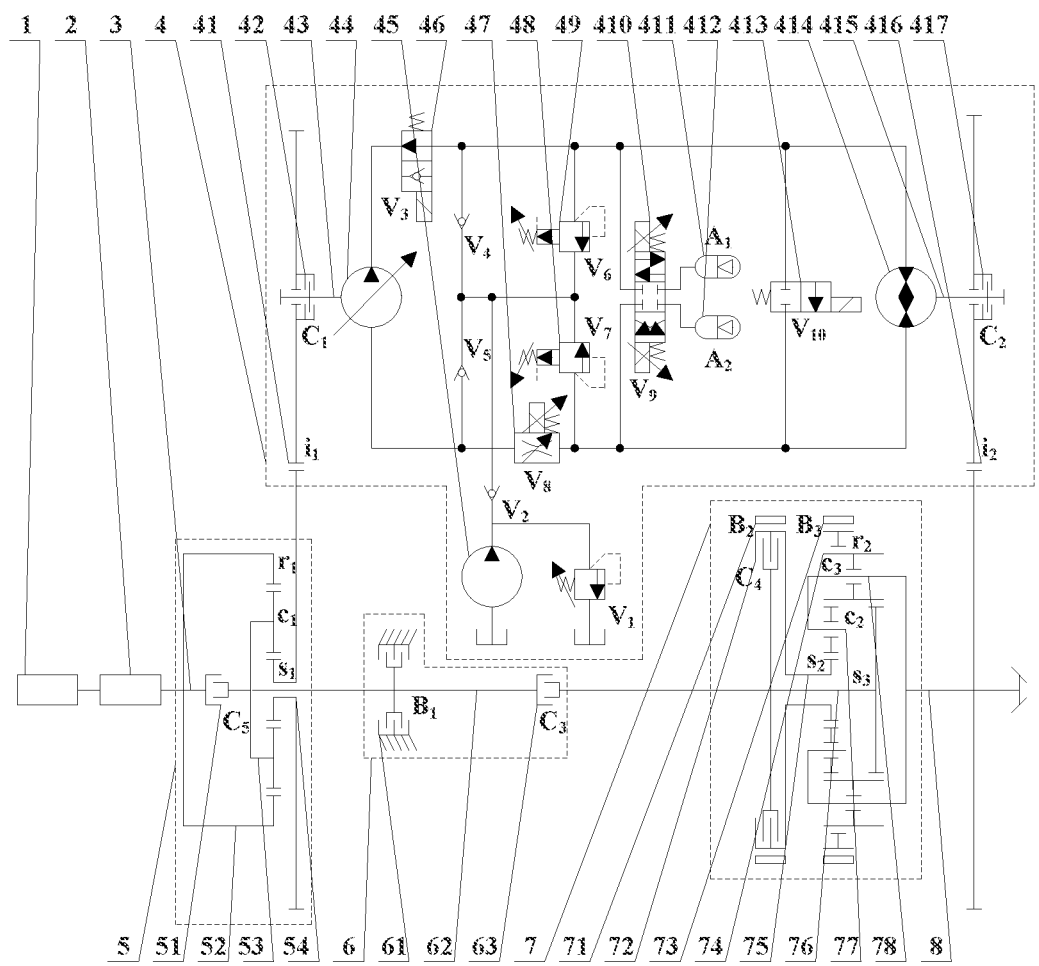
FIG. 1 is a schematic diagram of a power-split hydro-mechanical hybrid transmission system with an automatic adjustment function according to the present invention.

As shown in FIG. 1, the power-split hydro-mechanical hybrid transmission system with an automatic adjustment function of the present invention includes a frequency converter 1, a motor 2, an input shaft 3, a hydraulic transmission mechanism 4, a split mechanism 5, a mechanical transmission mechanism 6, a convergence mechanism 7, and an output shaft 8, wherein the frequency converter 1 enables the motor 2 to drive the input shaft 3 to rotate.

The split mechanism 5 includes a clutch $C_5$ 51, a split mechanism-ring gear 52, a split mechanism-planet carrier 53, and a split mechanism-sun gear 54. The clutch $C_5$ 51 is used for connecting the split mechanism-ring gear 52 and the split mechanism-planet carrier 53, the split mechanism-ring gear 52 is fixedly connected to the input shaft 3, the split mechanism-sun gear 54 is connected to an input end of the hydraulic transmission mechanism 4, and the split mechanism-planet carrier 53 is connected to the mechanical transmission mechanism 6.

The mechanical transmission mechanism 6 includes a brake $B_1$ 61, a mechanical transmission shaft 62, and a clutch $C_3$ 63. The mechanical transmission shaft 62 is used for connecting the split mechanism 5 and the convergence mechanism 7, the brake $B_1$ 61 is used for inhibiting motion of the mechanical transmission shaft 62, and the clutch $C_3$ 63 is used for connecting the mechanical transmission shaft 62.

The convergence mechanism 7 includes a brake $B_2$ 71, a clutch $C_4$ 72, a brake $B_3$ 73, a convergence mechanism-common ring gear 74, a convergence mechanism-small sun gear 75, a convergence mechanism-large sun gear 76, a convergence mechanism-short planet carrier 77, and a convergence mechanism-long planet carrier 78. The convergence mechanism-large sun gear 76 is connected to the mechanical transmission shaft 62, the convergence mechanism-short planet carrier 77 and the convergence mechanism-long planet carrier 78 are fixedly connected to the output shaft 8, the clutch $C_4$ 72 is used for connecting the convergence mechanism-small sun gear 75 and the mechanical transmission shaft 62, the brake $B_2$ 71 is used for inhibiting motion of the convergence mechanism-small sun gear 75, and the brake $B_3$ 73 is used for inhibiting motion of the convergence mechanism-common ring gear 74.

The hydraulic transmission mechanism 4 includes a hydraulic transmission input gear pair 41, a clutch $C_1$ 42, a variable displacement pump shaft 43, a variable displacement pump 44, an oil replenishing pump 45, a solenoid directional valve $V_3$ 46, a proportional throttle valve $V_8$ 47, a pilot-operated proportional relief valve $V_7$ 48, a pilot-operated proportional relief valve $V_6$ 49, a proportional directional valve $V_9$ 410, a high-pressure accumulator $A_1$ 411, a low-pressure accumulator $A_2$ 412, an emergency valve $V_{10}$ 413, a pump/motor mechanism 414, a pump/motor mechanism shaft 415, a hydraulic transmission output gear pair 416, and a clutch $C_2$ 417. The pump/motor mechanism 414 is a device configured for switching between functions of a hydraulic pump and a hydraulic motor, that is, when mechanical energy is input into the pump/motor mechanism 414, the pump/motor mechanism 414 outputs hydraulic energy, and when hydraulic energy is input into the pump/motor mechanism 414, the pump/motor mechanism 414 outputs mechanical energy. The clutch $C_1$ 42 is connected to the split mechanism 5 and the variable displacement pump shaft 43 through the hydraulic transmission input gear pair 41. The clutch $C_2$ 417 is connected to the convergence mechanism 7 and the pump/motor mechanism shaft 415 through the hydraulic transmission output gear pair 416. The variable displacement pump 44 drives the pump/motor mechanism 414. The solenoid directional valve $V_3$ 46 for one-way flow of oil is disposed on a high-pressure hydraulic pipe between the variable displacement pump 44 and the pump/motor mechanism 414. The proportional throttle valve $V_8$ 47 is disposed on a low-pressure hydraulic pipe between the variable displacement pump 44 and the pump/motor mechanism 414. The three-position four-way proportional directional valve $V_9$ 410 and the emergency valve $V_{10}$ 413 are connected in parallel between the high-pressure and low-pressure hydraulic pipes of the variable displacement pump 44 and the pump/motor mechanism 414. The two upper and lower ports on the left side of the three-position four-way proportional directional valve $V_9$ 410 are connected to the high-pressure and low-pressure pipes, respectively and the two upper and lower ports on the right side of the three-position four-way proportional directional valve $V_9$ 410 are connected to the high-pressure accumulator $A_1$ 411 and the low-pressure accumulator $A_2$ 412, respectively.

The low-pressure hydraulic pipe and the high-pressure hydraulic pipe share a safety valve group for pressure adjustment of the pipes. The safety valve group includes two check valves, the pilot-operated proportional relief valve $V_7$ 48, and the pilot-operated proportional relief valve $V_6$ 49. The two check valves are back-to-back connected in series and are then connected in parallel between the low-pressure hydraulic pipe and the high-pressure hydraulic pipe. The pilot-operated proportional relief valve $V_7$ 48 and the pilot-operated proportional relief valve $V_6$ 49 are connected in series and are then connected in parallel between the low-pressure hydraulic pipe and the high-pressure hydraulic pipe. A communication bypass is disposed between the two check valves and the pilot-operated proportional relief valve $V_7$ 48 and the pilot-operated proportional relief valve $V_6$ 49. The oil replenishing system is used for replenishing hydraulic oil in the low-pressure hydraulic pipe and/or the high-pressure hydraulic pipe. The oil replenishing system includes an oil replenishing pump 45, a relief valve $V_7$, and a check valve $V_2$. An outlet of the oil replenishing system is communicated with the bypass.

As shown in Table 1, transmission modes including hydraulic transmission, hydro-mechanical transmission, and mechanical transmission are provided between the input member and the output member by adjusting a displacement ratio of the hydraulic transmission mechanism 4 and selectively controlling engagement of the clutch assembly and the brake assembly.

Figure 2:
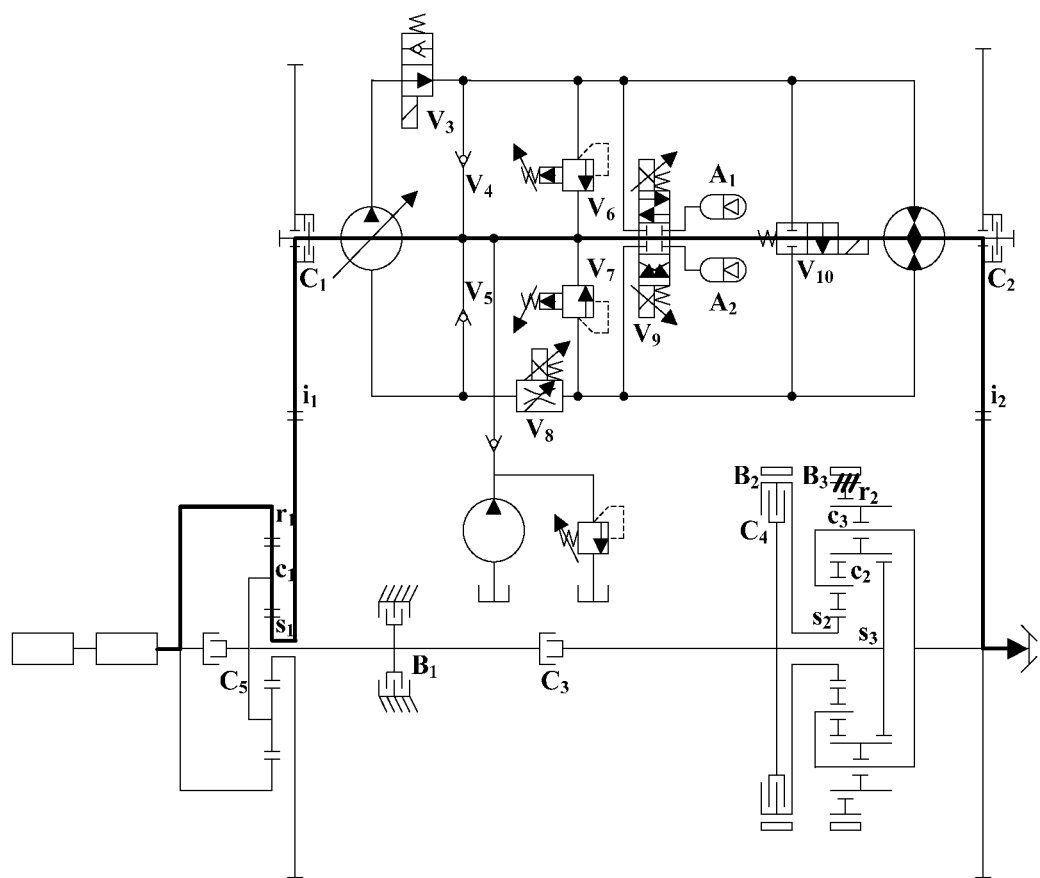
FIG. 2 is a schematic diagram showing the power flow in an F(H)/R(H) gear according to the present invention.

The hydraulic transmission includes an R(H) gear and an F(H) gear, which are described in detail below:

The power flow in the F(H)/R(H) gear is shown in FIG. 2. When the clutch $C_1$ 42, the clutch $C_2$ 417, and the brake $B_j$ 61 are engaged, power output from the motor 2 driven by the frequency converter 1 passes through the input shaft 3, the split mechanism-ring gear 52, the split mechanism-sun gear 54, and the hydraulic transmission mechanism 4 and is output from the output shaft 8. In this case, the output speed and the input speed are in the following relationship:

$$n_o = e n_E$$

wherein $n_E$ is the motor speed, $n_o$ is the output speed, and e is the displacement ratio of the hydraulic transmission mechanism.

When the motor rotates in a forward direction, the output speed is positive; and when the motor rotates in a reverse direction, the output speed is negative.

Figure 3:
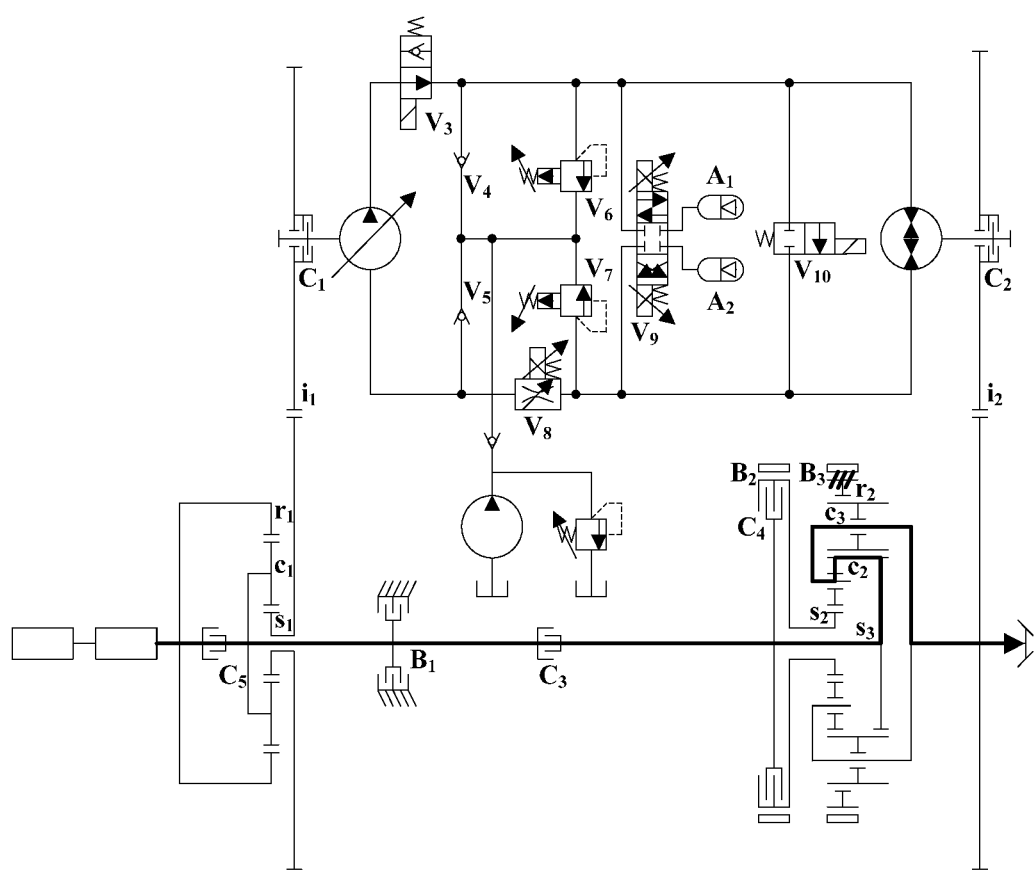
FIG. 3 is a schematic diagram showing the power flow in an R(M) gear according to the present invention.

The mechanical transmission includes an R(M) gear, an $F_1$(M) gear, and an $F_2$(M) gear, which are described in detail below:

The power flow in the R(M) gear is shown in FIG. 3. When the clutch $C_3$ 63, the clutch $C_5$ 51, and the brake $B_3$ 73 are engaged, power output from the motor 2 driven by the frequency converter 1 passes through the input shaft 3, the split mechanism 5 that is fixedly connected as a whole, the mechanical transmission mechanism 6, the convergence mechanism-large sun gear 76, and the convergence mechanism-long planet carrier 78 and is output from the output shaft 8. In this case, the output speed and the input speed are in the following relationship:

$$n_o = \frac{n_E}{-1.82}.$$

Figure 4:
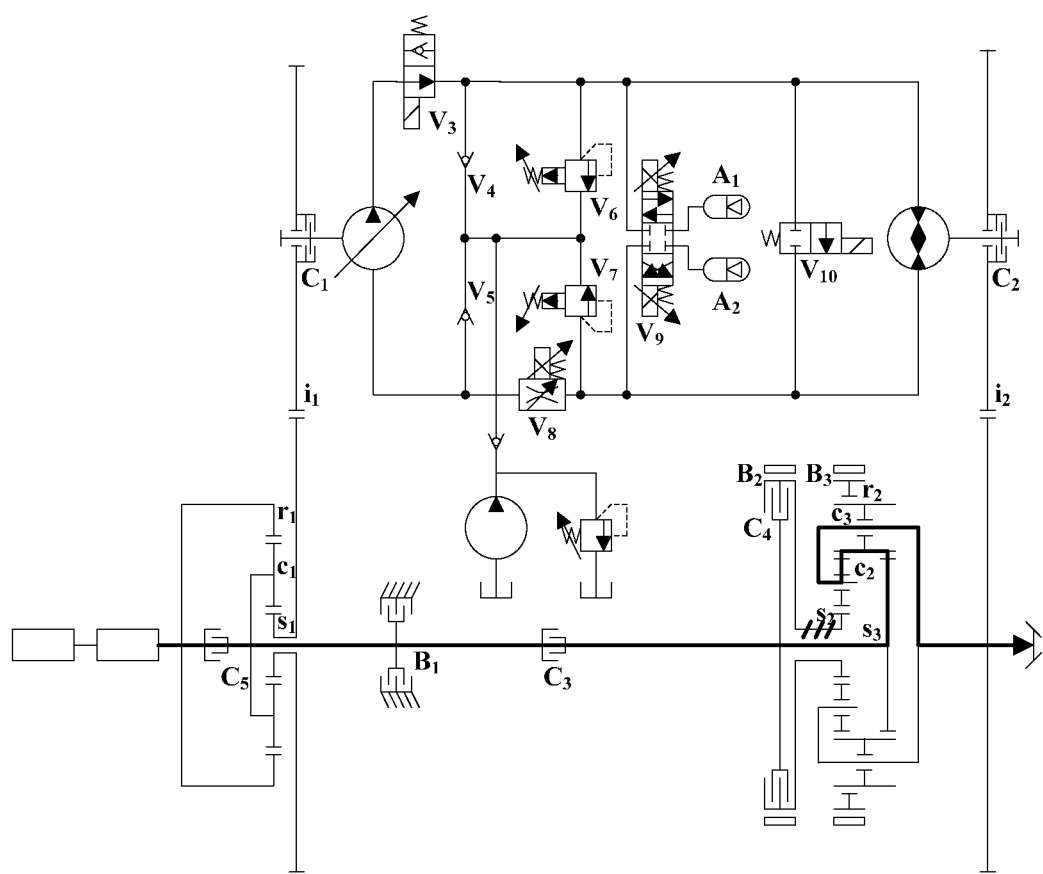
FIG. 4 is a schematic diagram showing the power flow in an $F_1(M)$ gear according to the present invention.

The power flow in the $F_1$(M) gear is shown in FIG. 4. When the clutch $C_3$ 63, the clutch $C_5$ 51, and the brake $B_2$ 71 are engaged, power output from the motor 2 driven by the frequency converter 1 passes through the input shaft 3, the split mechanism 5 that is fixedly connected as a whole, the mechanical transmission mechanism 6, the convergence mechanism-large sun gear 76, the convergence mechanism-common ring gear 74, and the convergence mechanism-long planet carrier 78 and is output from the output shaft 8. In this case, the output speed and the input speed are in the following relationship:

$$n_o = \frac{n_E}{1.82}.$$

Figure 5:
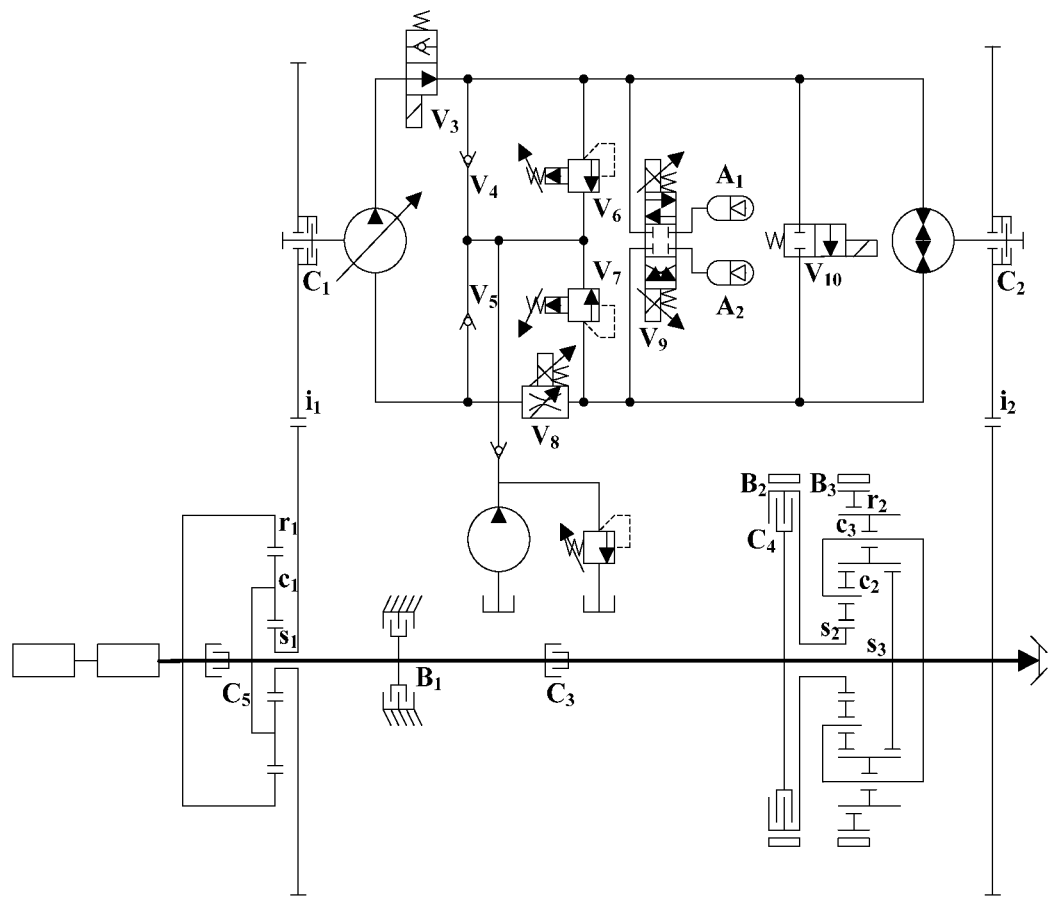
FIG. 5 is a schematic diagram showing the power flow in an $F_2(M)$ gear according to the present invention.

The power flow in the $F_2$(M) gear is shown in FIG. 5. When the clutch $C_3$ 63, the clutch $C_4$ 72, and the clutch $C_5$ 51 are engaged, power output from the motor 2 driven by the frequency converter 1 passes through the input shaft 3, the split mechanism 5 that is fixedly connected as a whole, the mechanical transmission mechanism 6, and the convergence mechanism 7 that is fixedly connected as a whole and is output from the output shaft 8. In this case, the output speed and the input speed are in the following relationship:

$$n_o = n_E.$$

Figure 6:
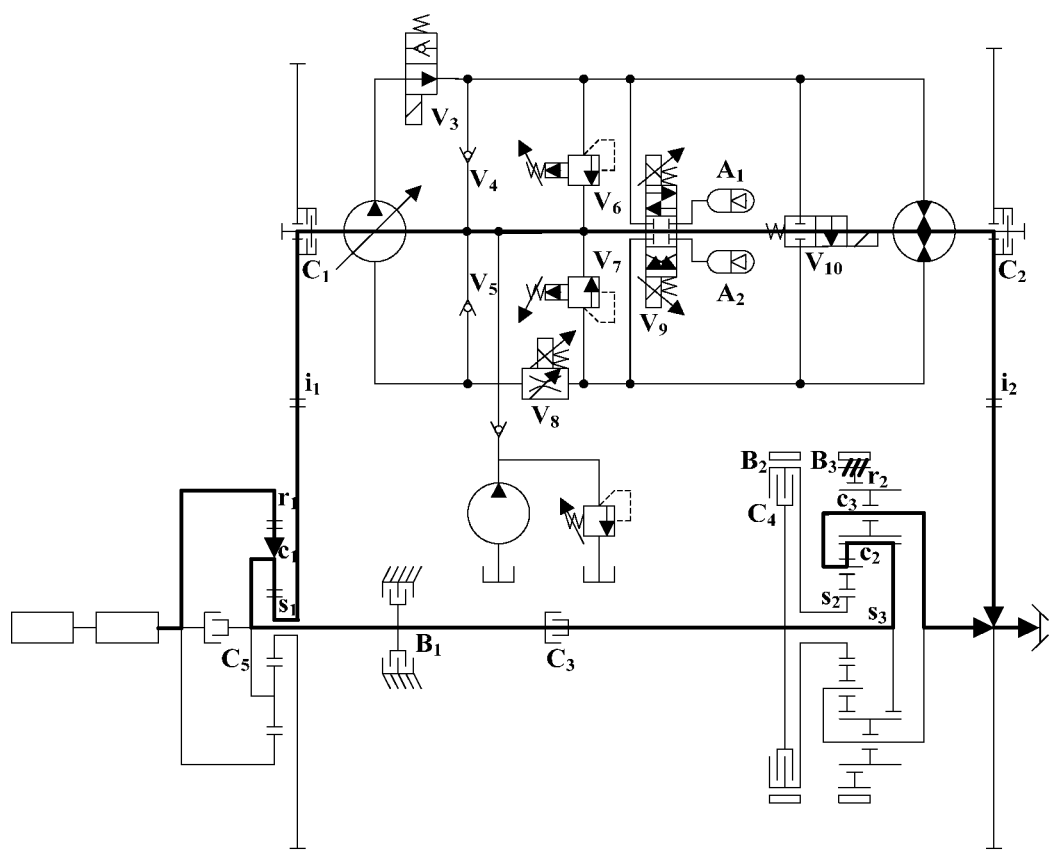
FIG. 6 is a schematic diagram showing the power flow in an R(HM) gear according to the present invention.

The mechanical transmission includes an R(HM) gear, an $F_1$(HM) gear, and an $F_2$(HM) gear, which are described in detail below:

The power flow in the R(HM) gear is shown in FIG. 6. When the clutch $C_1$ 42, the clutch $C_2$ 417, the clutch $C_3$ 63, and the brake $B_3$ 73 are engaged, power output from the motor 2 driven by the frequency converter 1 passes through the input shaft 3 and the split mechanism-ring gear 52 and is split into two parts. One part of the power is transmitted through the split mechanism-planet carrier 53, the mechanical transmission shaft 62, and the convergence mechanism-large sun gear 76 to the convergence mechanism-long planet carrier 78. The other part of the power is transmitted through the split mechanism-sun gear 54 and the hydraulic transmission mechanism 4 to the convergence mechanism-long planet carrier 78. After convergence at the convergence mechanism-long planet carrier 78, the hybrid power is output from the output shaft 8. In this case, the output speed and the input speed are in the following relationship:

$$n_o = \frac{1.5 n_E}{-4.55 - \frac{1}{e}}.$$

Figure 7:
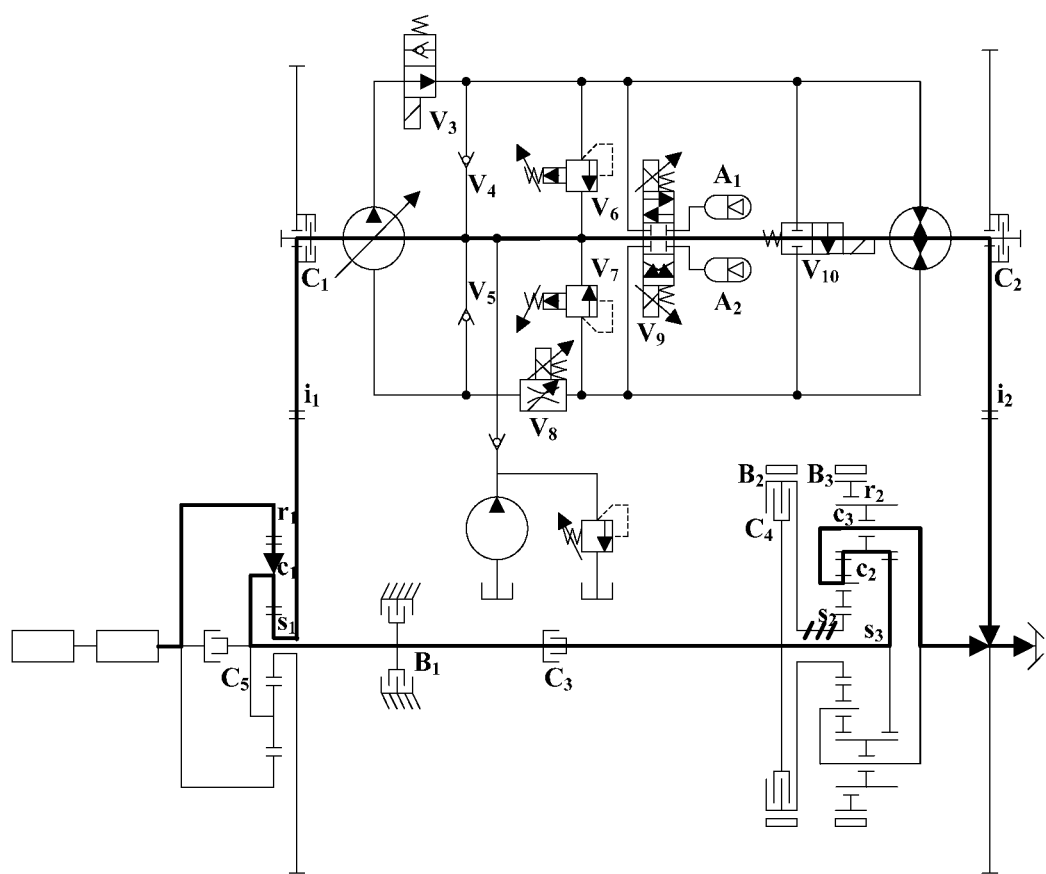
FIG. 7 is a schematic diagram showing the power flow in an $F_1$(HM) gear according to the present invention.

The power flow in the $F_1$(HM) gear is shown in FIG. 7. When the clutch $C_1$ 42, the clutch $C_2$ 417, the clutch $C_3$ 63, and the brake $B_2$ 71 are engaged, power output from the motor 2 driven by the frequency converter 1 passes through the input shaft 3 and the split mechanism-ring gear 52 and is split into two parts. One part of the power is transmitted through the split mechanism-planet carrier 53, the mechanical transmission shaft 62, the convergence mechanism-large sun gear 76, and the convergence mechanism-common ring gear 74 to the convergence mechanism-long planet carrier 78. The other part of the power is transmitted through the split mechanism-sun gear 54 and the hydraulic transmission mechanism 4 to the convergence mechanism-long planet carrier 78. After convergence at the convergence mechanism-long planet carrier 78, the hybrid power is output from the output shaft 8. In this case, the output speed and the input speed are in the following relationship:

$$n_o = \frac{1.5 n_E}{4.55 - \frac{1}{e}}.$$

Figure 8:
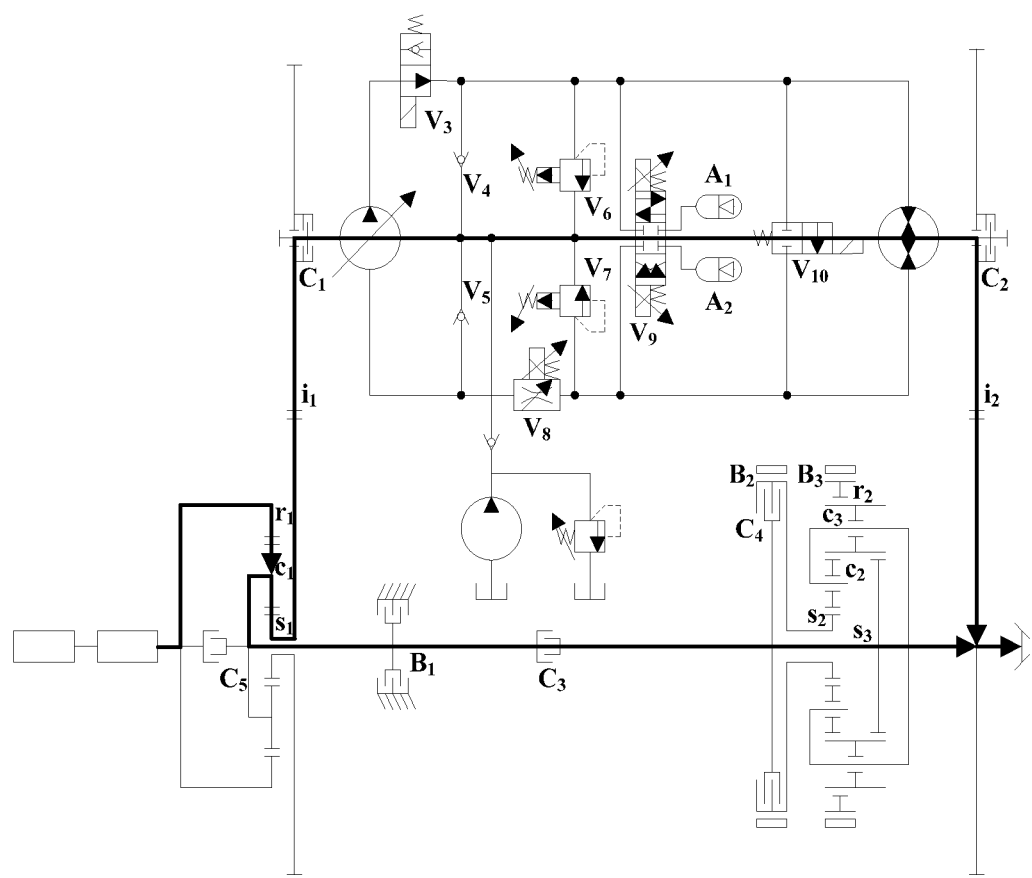
FIG. 8 is a schematic diagram showing the power flow in an $F_2$(HM) gear according to the present invention.

The power flow in the $F_2$(HM) gear is shown in FIG. 8. When the clutch $C_1$ 42, the clutch $C_2$ 417, the clutch $C_3$ 63, and the clutch $C_4$ 72 are engaged, power output from the motor 2 driven by the frequency converter 1 passes through the input shaft 3 and the split mechanism-ring gear 52 and is split into two parts. One part of the power is transmitted through the split mechanism-planet carrier 53 and the mechanical transmission shaft 62 to the convergence mechanism 7 that is fixedly connected as a whole. The other part of the power is transmitted through the split mechanism-sun gear 54 and the hydraulic transmission mechanism 4 to the convergence mechanism 7 that is fixedly connected as a whole. The hybrid power is output from the output shaft 8. In this case, the output speed and the input speed are in the following relationship:

$$n_o = \frac{1.5 n_E}{2.5 - \frac{1}{e}}.$$

and the frequency converter can be controlled to adjust the motor speed, thereby achieving joint adjustment.

The displacement ratio of the hydraulic transmission mechanism is in a range of $e \in [0, 1]$. When the motor rotates in the forward direction, the speed regulation range in the F(H) gear is $n_o \in [0, n_{Emax}]$; and when the motor rotates in the reverse direction, the speed regulation range in the R(H) gear is $n_o \in [-n_{Emax}, 0]$.

The following description is on the basis that the motor rotates in the forward direction, and conclusions can be drawn in the same manner when the motor rotates in the reverse direction.

The speed regulation range in the R(M) gear is $n_o \in [-0.55 n_{Emax}, 0]$;

the speed regulation range in the $F_1(M)$ gear is $n_o \in [0, 0.55 n_{Emax}]$;

the speed regulation range in the $F_2(M)$ gear is $n_o \in [0, n_{Emax}]$;

TABLE 1

Engagement/disengagement of each component

| Gear | Transmission mode | Motor direction | B₁ | B₂ | B₃ | C₁ | C₂ | C₃ | C₄ | C₅ | Output speed-motor speed relationship |
|---|---|---|---|---|---|---|---|---|---|---|---|
| F(H)/R(H) | Hydraulic transmission | +/− | ▲ | △ | △ | ▲ | ▲ | △ | △ | △ | $n_o = \dfrac{n_E}{i_1 i_2}$ |
| R(M) | Mechanical transmission | + | △ | △ | ▲ | △ | △ | ▲ | △ | ▲ | $n_o = \dfrac{n_E}{i_{m1}}$ |
| F₁(M) | | + | △ | ▲ | △ | △ | △ | ▲ | △ | ▲ | $n_o = \dfrac{n_E}{i_{m2}}$ |
| F₂(M) | | + | △ | △ | △ | △ | △ | ▲ | ▲ | ▲ | $n_o = \dfrac{n_E}{i_{m3}}$ |
| R(HM) | Hydro-mechanical transmission | + | △ | △ | ▲ | ▲ | ▲ | ▲ | △ | △ | $n_o = \dfrac{k n_E}{(k+1) i_{m1} - \dfrac{i_1 i_2}{e}}$ |
| F₁(HM) | | + | △ | ▲ | △ | ▲ | ▲ | ▲ | △ | △ | $n_o = \dfrac{k n_E}{(k+1) i_{m2} - \dfrac{i_1 i_2}{e}}$ |
| F₂(HM) | | + | △ | △ | △ | ▲ | ▲ | ▲ | ▲ | △ | $n_o = \dfrac{k n_E}{(k+1) i_{m3} - \dfrac{i_1 i_2}{e}}$ |

In Table 1: ▲ stands for engagement of a component;

the main parameters are: $n_o$ is the rotation speed of the output shaft, $n_E$ is the motor speed, e is the displacement ratio of the hydraulic transmission mechanism, i is the transmission ratio of a related gear, and $i_m$ is the transmission ratio of the convergence mechanism in different gears; $i_1 i_2 = 1.00$, $k = 1.5$, $i_{m1} = -1.82$, $i_{m2} = 1.82$, $i_{m3} = 1.00$;

F stands for forward direction, R stands for reverse direction, H stands for hydraulic transmission, M stands for mechanical transmission, and HM stands for hydro-mechanical transmission.

In various transmission modes, on the premise that the displacement ratio of the hydraulic transmission mechanism remains unchanged, stepless speed regulation can be implemented by adjusting the motor speed, and the rotation direction of the output shaft is determined by the rotation direction of the motor. In addition, the displacement of the variable displacement pump can be adjusted to control the displacement ratio of the hydraulic transmission mechanism, the speed regulation range in the R(HM) gear is $n_o \in [-0.27 n_{Emax}, 0]$;

the F(H) gear can be shifted to the $F_1(HM)$ gear and the $F_2(HM)$ gear, and the displacement ratio of the hydraulic transmission mechanism in these two gears is in a range of $e \in [0.50, 1.00]$;

that is, at the same motor speed, when $e = 0.55$, the F(H) gear can be synchronously shifted to the $F_1(HM)$ gear, and the value range in the $F_1(HM)$ gear is $n_o \in [0, 0.59 n_{Emax}]$;

that is, at the same motor speed, when $e = 1.00$, the F(H) gear can be synchronously shifted to the $F_2(HM)$ gear, and the value range in the $F_2(HM)$ gear is $n_o \in [0, 3 n_{Emax}]$.

The reverse transmission of the system can be implemented in three manners:

1. The R(H) gear is implemented through reverse rotation of the motor and adjustment of the displacement ratio of the hydraulic transmission mechanism, wherein the speed regulation range is $n_o \in [-n_{Emax}, 0]$;

2. The R(M) gear is implemented through forward rotation of the motor, wherein the speed regulation range is $n_o \in [-0.55n_{Emax}, 0]$;

3. The R(HM) gear is implemented through forward rotation of the motor and adjustment of the displacement ratio of the hydraulic transmission mechanism, wherein the speed regulation range is $n_o \in [-0.27n_{Emax}, 0]$.

When the motor rotates in the forward direction, the forward transmission of the system can be implemented in five manners:

4. The F(H) gear is implemented through forward rotation of the motor and adjustment of the displacement ratio of the hydraulic transmission mechanism, wherein the speed regulation range is $n_o \in [0, n_{Emax}]$;

5. The $F_1(M)$ gear is implemented through forward rotation of the motor, wherein the speed regulation range is $n_o \in [0, 0.55n_{Emax}]$;

6. The $F_2(M)$ gear is implemented through forward rotation of the motor, wherein the speed regulation range is $n_o \in [0, n_{Emax}]$;

7. When the F(H) gear is shifted to the $F_1(HM)$ gear, the synchronous shift point is e=0.55 at the same motor speed, and when $e \in [0.50, 1.00]$, the gear is implemented through forward rotation of the motor and adjustment of the displacement ratio of the hydraulic transmission mechanism, wherein the speed regulation range is $n_o \in [0, 0.59n_{Emax}]$;

8. When the F(H) gear is shifted to the $F_2(HM)$ gear, the synchronous shift point is e=1.00 at the same motor speed, and when $e \in [0.50, 1.00]$, the gear is implemented through forward rotation of the motor and adjustment of the displacement ratio of the hydraulic transmission mechanism, wherein the speed regulation range is $n_o \in [0, 3n_{Emax}]$.

Figure 9:
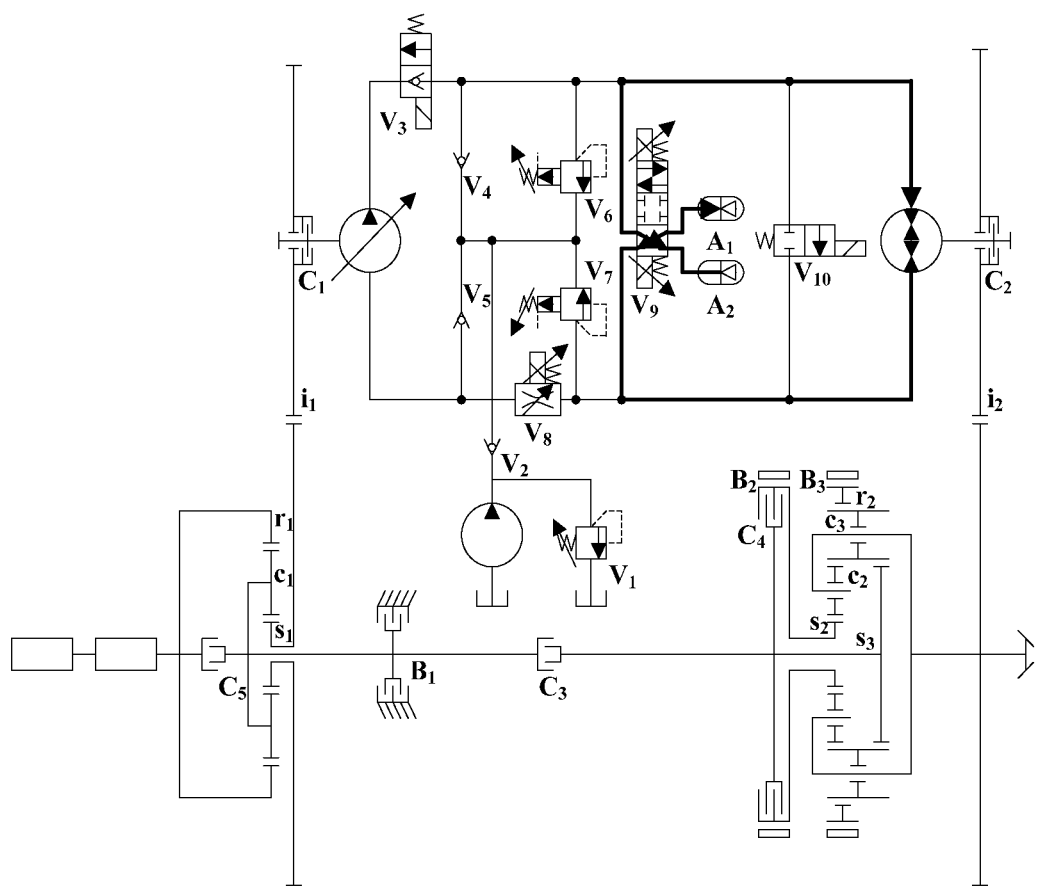
FIG. 9 is a schematic diagram showing energy recovery of an auxiliary power source according to the present invention.

As shown in FIG. 9, when the vehicle decelerates, the clutch $C_2$ 417 is engaged, and the braking energy is transmitted through the output shaft 8 and the hydraulic transmission output gear pair 416 to the pump/motor mechanism 414. In this case, the pump/motor mechanism 414 works as a hydraulic pump, the solenoid directional valve $V_3$ 46 is powered on to prevent external oil from flowing back to the variable displacement pump 44, the proportional throttle valve $V_8$ 47 reduces port opening to increase pressure at the oil outlet of the pump/motor mechanism 414, the three-position four-way proportional directional valve $V_9$ 410 is in a lower position, and the pilot-operated proportional relief valve $V_7$ 48 sets the system safety pressure and ensures the implementation of oil replenishing. When the pressure at the oil outlet of the pump/motor mechanism 414 is greater than the set pressure of the high-pressure accumulator $A_1$ 411, energy is stored into the high-pressure accumulator $A_1$ 411 through the oil outlet of the pump/motor mechanism 414, and oil is replenished by the low-pressure accumulator $A_2$ 412 to the oil inlet of the pump/motor mechanism 414.

Figure 10:
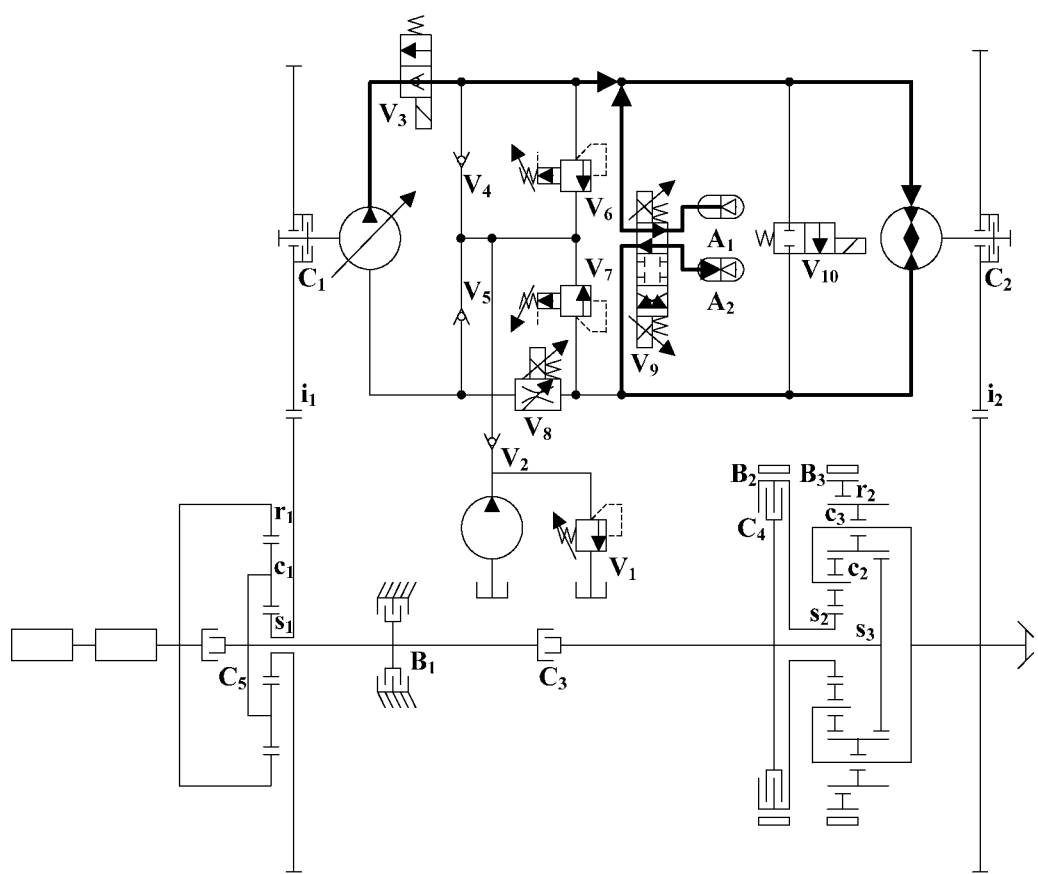
FIG. 10 is a schematic diagram showing that the auxiliary power source and a motor jointly drive a transmission device according to the present invention.

As shown in FIG. 10, when the vehicle accelerates, the pump/motor mechanism 414 works as a hydraulic motor, the solenoid directional valve $V_3$ 46 is powered on to prevent external oil from flowing back to the variable displacement pump 44, the three-position four-way proportional directional valve $V_9$ 410 is in an upper position, and the pilot-operated proportional relief valve $V_6$ 49 sets the system safety pressure and ensures the implementation of oil discharge. The high-pressure accumulator $A_1$ 411 alone or together with the variable displacement pump 44 releases energy to drive the pump/motor mechanism 414 to work, and the low-pressure accumulator $A_2$ 412 can recover the residual energy.

Figure 11:
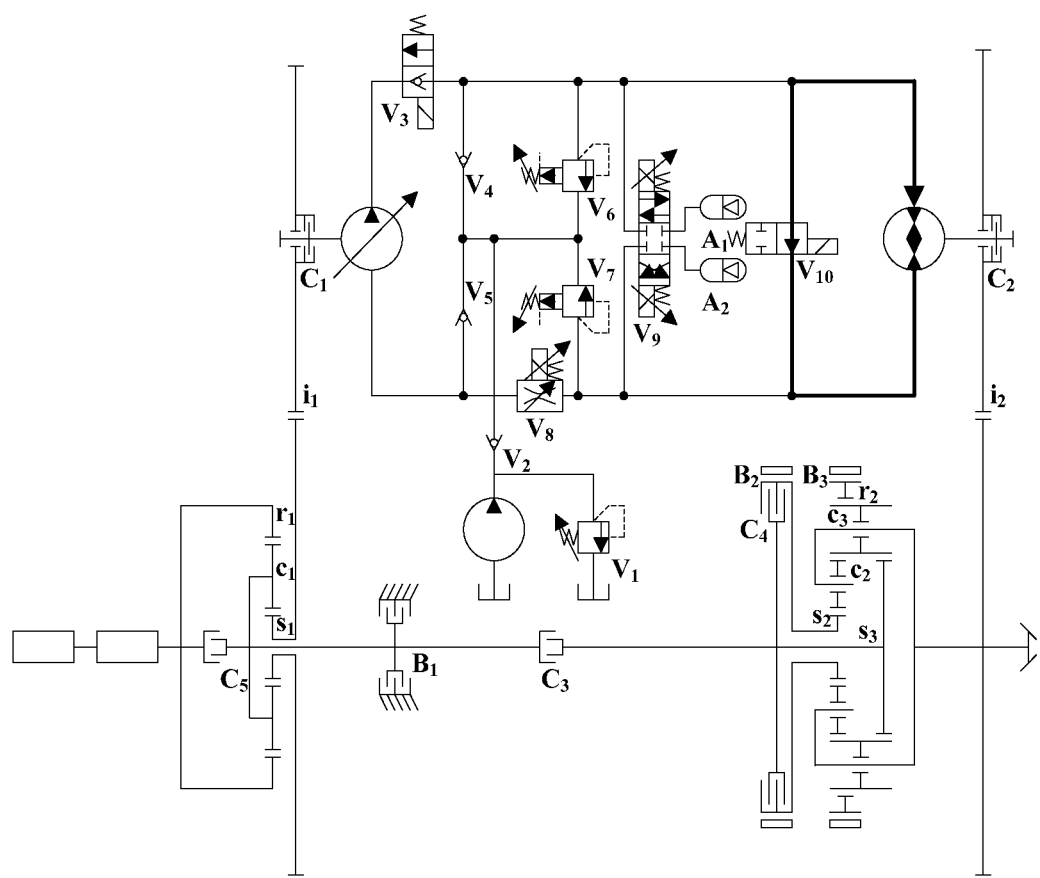
FIG. 11 is a schematic diagram showing the power release flow of a pump/motor mechanism according to the present invention.

As shown in FIG. 11, when the pump/motor mechanism 414 works as a hydraulic pump, the solenoid directional valve $V_3$ 46 is powered on to prevent external oil from flowing back to the variable displacement pump 44, the emergency valve $V_{10}$ 413 is powered on, the pressure at the oil inlet of the pump/motor mechanism 414 equals the pressure at the oil outlet thereof, and the braking energy cannot be further stored into the accumulation mechanism or transmitted to the variable displacement pump 44.

Figure 12:
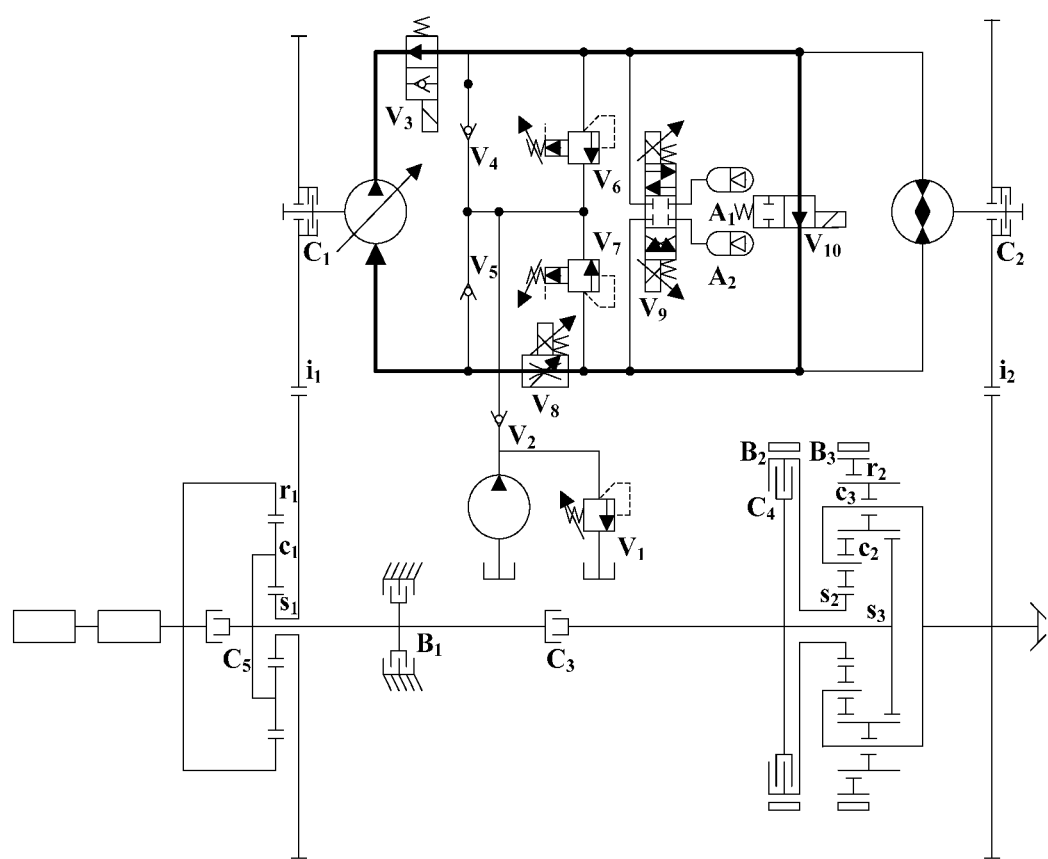
FIG. 12 is a schematic diagram showing the power release flow of a variable displacement pump according to the present invention.

As shown in FIG. 12, when the pump/motor mechanism 414 works as a hydraulic motor, the solenoid directional valve $V_3$ 46 is powered on to prevent external oil from flowing back to the variable displacement pump 44, the emergency valve $V_{10}$ 413 is powered on, the pressure at the oil inlet of the variable displacement pump 44 equals the pressure at the oil outlet thereof, and the energy cannot be further transmitted to the pump/motor mechanism 414.

Figure 13:
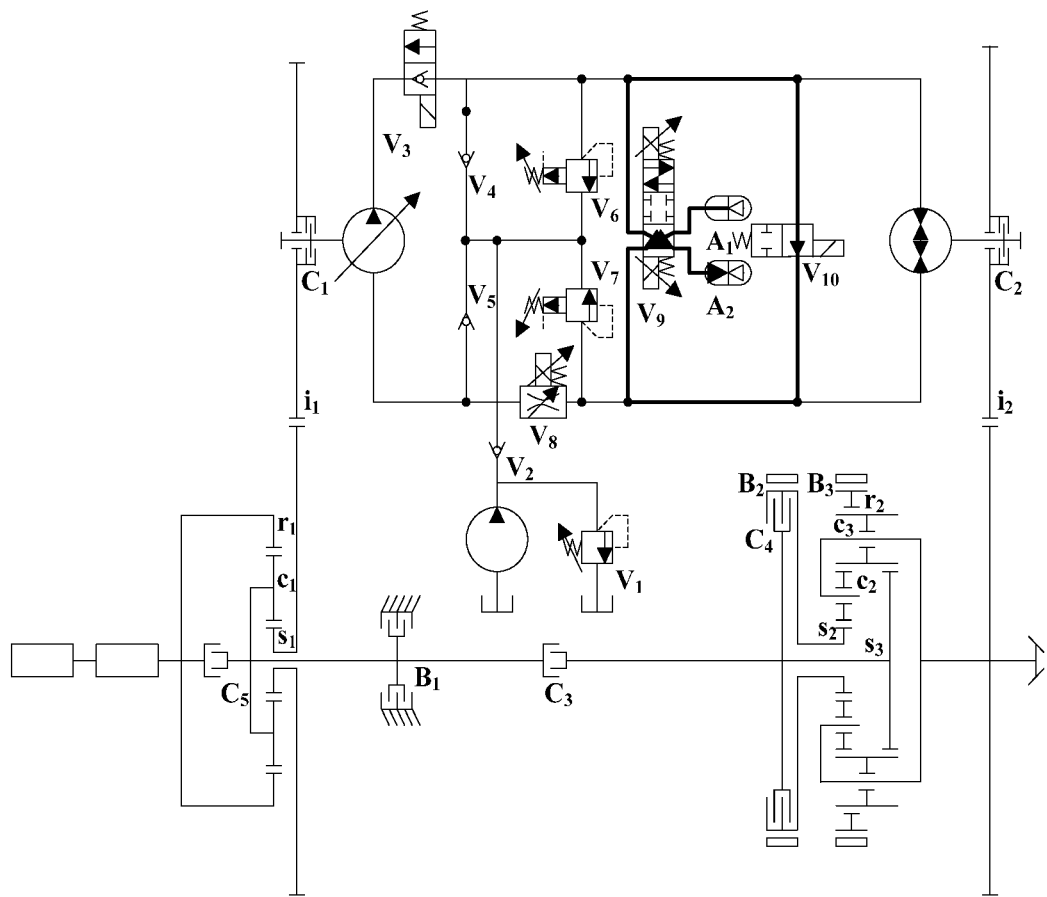
FIG. 13 is a schematic diagram showing the power release flow of the auxiliary power source according to the present invention.

As shown in FIG. 13, the solenoid directional valve $V_3$ 46 is powered on to prevent external oil from flowing back to the variable displacement pump 44, the emergency valve $V_{10}$ 413 is powered on, and the high-pressure accumulator $A_1$ 411 is communicated with the low-pressure accumulator $A_2$ 412 to eventually acquire the same pressure.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A power-split hydro-mechanical hybrid transmission system with an automatic adjustment function, comprising an input member, a hydraulic transmission mechanism, a split mechanism, a convergence mechanism, an output member, a clutch assembly, and a brake assembly, wherein the clutch assembly connects the input member to an input end of the split mechanism, connects an output end of the split mechanism to an input end of the hydraulic transmission mechanism and an input end of the convergence mechanism, and connects an output end of the hydraulic transmission mechanism to the output member; an output end of the convergence mechanism is connected to the output member; and the clutch assembly and the brake assembly provide a continuous transmission ratio between the input member and the output member;

transmission modes comprising hydraulic transmission, hydro-mechanical transmission, and mechanical transmission are provided between the input member and the output member by adjusting a displacement ratio of the hydraulic transmission mechanism and selectively controlling engagement of the clutch assembly and the brake assembly;

the split mechanism comprises a split mechanism-ring gear, a split mechanism-planet carrier, and a split mechanism-sun gear, wherein the split mechanism-ring gear is connected to the input member;

the convergence mechanism comprises a convergence mechanism-common ring gear, a convergence mechanism-small sun gear, a convergence mechanism-large sun gear, a convergence mechanism-short planet carrier, and a convergence mechanism-long planet carrier, wherein the convergence mechanism-short planet carrier is connected to the convergence mechanism-long planet carrier, and the convergence mechanism-long planet carrier is connected to the output member; the convergence mechanism-common ring gear, the convergence mechanism-small sun gear, and the convergence mechanism-short planet carrier form a planetary gear train, while the convergence mechanism-common ring gear, the convergence mechanism-large sun near, and the convergence mechanism-long planet carrier form another planetary gear train;

the clutch assembly comprises a clutch $C_1$ and a clutch $C_2$, wherein the clutch $C_1$ is used for selectively connecting the split mechanism-sun gear to the input end of the hydraulic transmission mechanism to achieve synchronous rotation, and the clutch $C_2$ is used for selectively connecting the output end of the hydraulic transmission mechanism to the output member to achieve synchronous rotation; the brake assembly comprises a brake $B_1$, wherein the brake $B_1$ is used for selectively connecting the split mechanism-planet carrier to a fixed member;

the clutch $C_1$, the clutch $C_2$, and the brake $B_1$ are engaged to provide forward or reverse hydraulic transmission between the input member and the output member.

2. The power-split hydro-mechanical hybrid transmission system with the automatic adjustment function according to claim 1, wherein the clutch assembly further comprises a clutch $C_3$, a clutch $C_4$, and a clutch $C_5$, wherein the clutch $C_3$ is used for selectively connecting the split mechanism-planet carrier to the convergence mechanism-large sun gear to achieve synchronous rotation, the clutch $C_4$ is used for selectively connecting the convergence mechanism-small sun gear to the convergence mechanism-large sun gear to achieve synchronous rotation, and the clutch $C_5$ is used for selectively connecting the split mechanism-ring gear to the split mechanism-planet carrier to achieve synchronous rotation; the brake assembly further comprises a brake $B_2$ and a brake $B_3$, wherein the brake $B_2$ is used for selectively connecting the convergence mechanism-small sun gear to a fixed member, and the brake $B_3$ is used for selectively connecting the convergence mechanism-common ring gear to a fixed member;

the clutch $C_3$, the clutch $C_5$, and the brake $B_3$ are engaged to provide reverse mechanical transmission between the input member and the output member; the clutch $C_3$, the clutch $C_5$, and the brake $B_2$ are engaged or the clutch $C_3$, the clutch $C_4$, and the clutch $C_5$ are engaged to provide different forward mechanical transmissions between the input member and the output member.

3. The power-split hydro-mechanical hybrid transmission system with the automatic adjustment function according to claim 2, wherein the clutch $C_1$, the clutch $C_2$, the clutch $C_3$, and the brake $B_3$ are engaged to provide reverse hydromechanical transmission between the input member and the output member;

the clutch $C_1$, the clutch $C_2$, the clutch $C_3$, and the brake $B_2$ are engaged or the clutch $C_1$, the clutch $C_2$, the clutch $C_3$, and the clutch $C_4$ are engaged to provide different forward hydro-mechanical transmissions between the input member and the output member.

4. The power-split hydro-mechanical hybrid transmission system with the automatic adjustment function according to claim 1, wherein the hydraulic transmission mechanism comprises a variable displacement pump, an oil replenishing system, a solenoid directional valve $V_3$, a proportional throttle valve $V_8$ a safety valve group, a three-position four-way proportional directional valve $V_9$, a high-pressure accumulator $A_1$, a low-pressure accumulator $A_2$, an emergency valve $V_{10}$, and a pump/motor mechanism, wherein an input end of the variable displacement pump is connected to the output end of the split mechanism through the clutch $C_1$, an output end of the pump/motor mechanism is connected to the output member through the clutch $C_2$, the variable displacement pump is used for driving the pump/motor mechanism, the solenoid directional valve $V_3$ for one-way flow of oil is disposed on a high-pressure hydraulic pipe between an oil outlet of the variable displacement pump and an oil inlet of the pump/motor mechanism; the proportional throttle valve $V_8$ is disposed on a low-pressure hydraulic pipe between an oil inlet of the variable displacement pump and an oil outlet of the pump/motor mechanism; the proportional directional valve $V_9$ is connected in parallel between the low-pressure hydraulic pipe and the high-pressure hydraulic pipe; the high-pressure accumulator $A_1$ and the low-pressure accumulator $A_2$ are both connected to the proportional directional valve $V_9$;

the low-pressure hydraulic pipe and the high-pressure hydraulic pipe share the safety valve group for pressure adjustment of the pipes; the oil replenishing system is used for replenishing hydraulic oil in the low-pressure hydraulic pipe and/or the high-pressure hydraulic pipe.

5. The power-split hydro-mechanical hybrid transmission system with the automatic adjustment function according to claim 4, wherein when the output member decelerates, the clutch $C_2$ is engaged, and braking energy of the output member is transmitted to the pump/motor mechanism; the pump/motor mechanism works as a hydraulic pump; the solenoid directional valve $V_3$ is controlled to be powered on, preventing the oil from flowing back to the variable displacement pump; the proportional throttle valve $V_8$ is controlled to reduce port opening, thereby increasing pressure at the oil outlet of the pump/motor mechanism; the proportional directional valve $V_9$ is controlled to make the low-pressure accumulator $A_2$ communicated with the oil inlet of the pump/motor mechanism to replenish oil; and the proportional directional valve $V_9$ is controlled to make the high-pressure accumulator $A_1$ communicated with the oil outlet of the pump/motor mechanism to store energy.

6. The power-split hydro-mechanical hybrid transmission system with the automatic adjustment function according to claim 4, wherein when the output member accelerates, the pump/motor mechanism works as a hydraulic pump; the solenoid directional valve $V_3$ is controlled to be powered on, preventing the oil from flowing back to the variable displacement pump; the proportional directional valve $V_9$ is controlled to make the low-pressure accumulator $A_2$ communicated with the oil outlet of the pump/motor mechanism-; the proportional directional valve $V_9$ is controlled to make the high-pressure accumulator $A_1$ communicated with the oil inlet of the pump/motor mechanism-; the pump/motor mechanism is driven by the high-pressure accumulator $A_1$ alone or by both the high-pressure accumulator $A_1$ and the variable displacement pump; and the low-pressure accumulator $A_2$ is used for recovering residual energy.

7. The power-split hydro-mechanical hybrid transmission system with the automatic adjustment function according to claim 4, wherein the emergency valve $V_{10}$ is further connected in parallel between the low-pressure hydraulic pipe and the high-pressure hydraulic pipe; the emergency valve $V_{10}$ is controlled to cut off power transmitted from the variable displacement pump, or switch power to be stored by the pump/motor mechanism, or release power stored in the high-pressure accumulator $A_1$ and the low-pressure accumulator $A_2$.

* * * * *